United States Patent [19]

Kawakami

[11] 4,072,012
[45] Feb. 7, 1978

[54] DUAL-SYSTEM MASTER CYLINDER

[75] Inventor: Susumu Kawakami, Toyodashi, Japan

[73] Assignee: Toyota Jidosha Kogyo Kabushiki Kaisha, Japan

[21] Appl. No.: 722,504

[22] Filed: Sept. 13, 1976

[30] Foreign Application Priority Data

Oct. 3, 1975 Japan .................................. 50-119485
Oct. 3, 1975 Japan .................................. 50-119486

[51] Int. Cl.² ............................................. B60T 11/20
[52] U.S. Cl. ......................................... 60/562; 60/588
[58] Field of Search ................. 60/562, 581, 546, 575, 60/576, 577, 588, 592

[56] References Cited

U.S. PATENT DOCUMENTS

| | | | |
|---|---|---|---|
| 2,041,164 | 5/1936 | Carroll | 60/577 |
| 2,299,979 | 10/1942 | Hammond | 60/577 |
| 3,062,011 | 11/1962 | Brooks | 60/577 |
| 3,210,941 | 10/1965 | Stelzer | 60/562 |
| 3,659,421 | 5/1972 | Wilson | 60/562 |
| 3,729,932 | 5/1973 | Nakashima | 60/562 |
| 3,800,539 | 4/1974 | Le Marchand | 60/562 |
| 3,946,563 | 3/1976 | Rivetti | 60/562 |

Primary Examiner—Martin P. Schwadron
Assistant Examiner—Abraham Hershkovitz
Attorney, Agent, or Firm—Browdy and Neimark

[57] ABSTRACT

A master cylinder assembly includes a cylinder having a large-diameter portion and a small-diameter portion. A piston body is slidably positioned within the cylinder, a front and a rear pressure chamber are provided. A first compensation port controls communication between a fluid reservoir and one of the pressure chambers. A large piston is slidably mounted around the piston body and cooperates with a second compensation port to control communication between the fluid reservoir and a brake fluid operating chamber. The piston body has a bore extending axially therethrough providing continuous fluid communication from the front pressure chamber to the rear pressure chamber.

7 Claims, 9 Drawing Figures

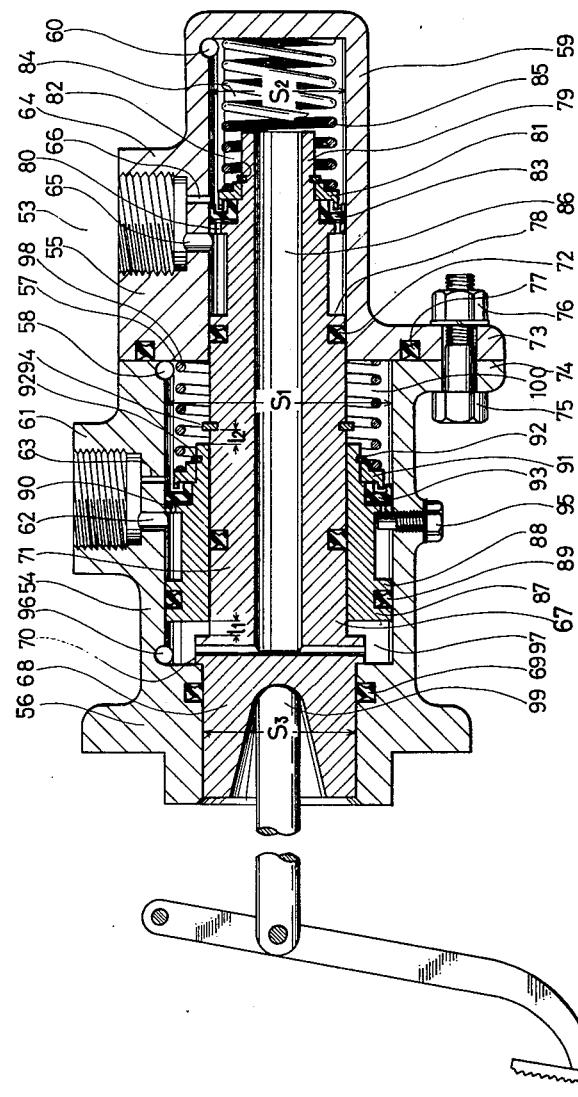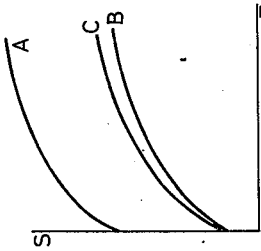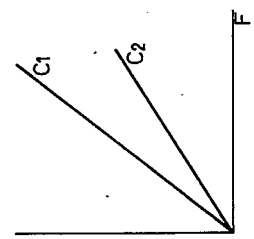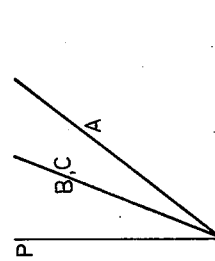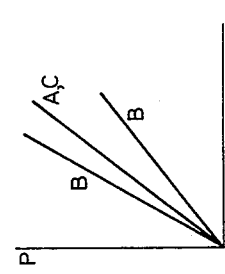

DUAL-SYSTEM MASTER CYLINDER

BACKGROUND OF THE INVENTION

This invention relates to a dual-system master cylinder assembly useful particularly in vehicle braking systems. The invention relates more particularly to a dual-system master cylinder assembly which compensates for failure of one of the two systems with minimum of stroke loss and without significant increase in stepping force.

As braking devices for automobiles, there is now widely employed dual-system braking arrangements. Such dual-system braking arrangements are often provided with one system specified for front wheel braking and the other system for rear wheel braking, so as to prevent breakdown of the entire brake system due to damage or malfunctioning of a certain part such as brake fluid conduit, hose and the like. A typical example of the master cylinders used in most braking arrangements is the tandem type which includes two pistons, that is, a first piston disposed in the rear part of a cylinder of the uniform diameter, this piston being connected to a push rod and a second piston disposed in the front part of the cylinder. An operating brake fluid chamber and a return spring are interposed between the two pistons.

In this type of master cylinder, however, if one of the brake fluid conduits, hoses and other parts connecting respective outlet ports and front and rear wheel cylinders should be damaged or fail for some reason or the other, the brake stroke is elongated correspondingly, impairing the braking performamce with the result that normal braking operation cannot be effected.

On the other hand, in a stepped type master cylinder a large-diameter piston and a small-diameter piston are formed integral with each other in the inside of a stepped cylinder, so that operating brake fluid feed and discharge from the outlet ports to the front and back braking systems are accomplished simultaneously, but there is inevitably created a certain delicate operational difference between the parts connected to the outlet ports, such as a brake fluid conduit, or hose, or wheel cylinder, brake shoe clearance and the like, for the front wheels and those for the rear wheels. There are also differences in the possibilities of generation of vapor locks, arrangement of accumulators and other conditions, resulting in difference in hydraulic rigidity or brake fluid discharge, so that pressures provided from the two outlet ports undesirably differ from one another.

SUMMARY OF THE INVENTION

It is an object of the present invention to provide a novel dual-system master cylinder assembly which, in order to overcome the above-mentioned problems of conventional dual-system master cylinder assemblies, is specifically arranged such that a large-diameter piston fitted in a corresponding large cylinder portion of a cylinder is movable relative to a small-diameter piston so that an always balanced dual-system brake fluid pressure is produced and that, in the event of failure of one of the systems, the stroke loss is minimized while increasing the output brake fluid pressure to allow as effective braking performance as in normal operation.

It is another object of the present invention to provide a novel dual-system master cylinder assembly whereby even in case one system should fail, stroke loss can be minimized and also the output brake fluid pressure can be boosted to provide sufficient braking action with application of same pedal stepping force as required in normal operation.

In order to accomplish the above-said objects, as well as others which are to become apparent from the text below, the present invention provides an improved arrangement of a dual-system master cylinder assembly in which brake fluid pressure produced by a first piston fitted in a small cylinder portion of a stepped cylinder is allowed to pass through a bore in this piston to provide a back pressure to the rear end of a second, large piston sheathing the first piston and slidably arranged thereon. As a result, the brake fluid pressure developed in a large cylinder portion of the stepped cylinder by the large piston will be always equal to the brake fluid pressure produced by the first smaller piston and, in case trouble should occur in the hydraulic system, operating brake fluid pressure is effectively boosted after the large piston has moved a slight prescribed distance relative to the first piston so that an effective braking force is provided with minimized stroke loss. When one of the two systems fails, reaction force in the pressure chamber in the system in trouble fades away so that when the brake pedal is stepped in with normal stepping force, there is produced in the pressure chamber in the still normal system a brake fluid pressure increased by an amount equal to the loss caused by the trouble. The rear end portion of the first piston is formed smaller diametrally than the large piston so that the required braking force can be produced with a low pedal stepping effort. On the other hand, should the hydraulic system fail, effective boost of brake fluid pressure takes place after the large piston has moved a slight prescribed distance relative to the first piston so that the effective braking may be accomplished with minimized stroke loss, and as this happens, reaction force in the pressure chamber of the system in trouble fades away so that when the brake pedal is stepped in with normal foot pressure, there is produced in the pressure chamber in the still normal system a brake fluid pressure increased by an amount equal to the pressure loss caused by the trouble

BRIEF DESCRIPTION OF THE DRAWINGS

FIGS. 5a to 5b are graphs illustrating the operating characteristics of the respective dual-system master cylinder assemblies of FIGS. 4A to 4C, with FIG. 5a showing the stepping force, brake fluid pressure relationship in the normal dual-system, FIG. 5b showing the same relationship in the event of failure of one of the systems, FIG. 5c showing the relationship between stepping force and braking force, and FIG. 5d showing the relationship between stepping force and stroke.

FIG. 6 is a diagrammatic, sectional view showing a second embodiment of a dual-system master cylinder assembly according to the present invention.

DETAILED DESCRIPTION OF THE PREFERRED EMBODIMENTS

Figure 1:
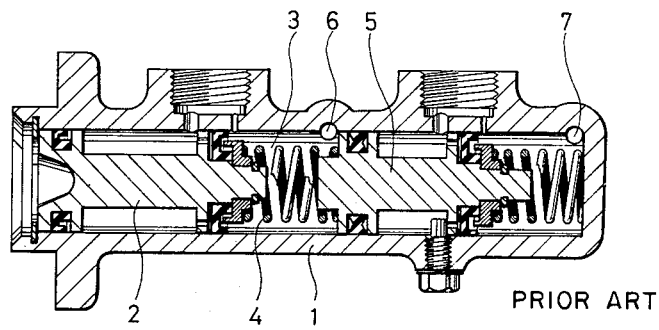
FIGS. 1 and 2 are diagrammatic, respective, sectional views of two conventional dual-system master cylinder assemblies.
Figure 2:
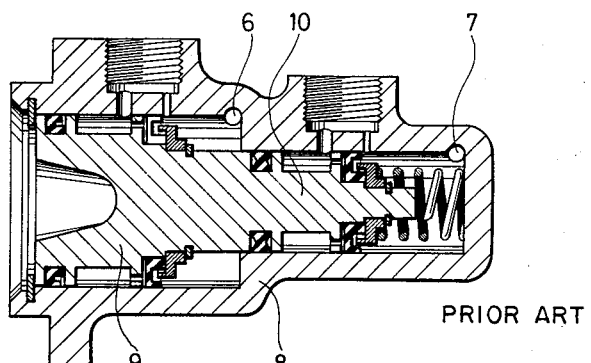

Before turning to a discussion of illustrative embodiments of the present invention in detail, a brief discussion of conventional dual system master cylinder assemblies appears to be in order, reference being made to FIGS. 1 and 2.

A typical example of a conventional dual-system master cylinder assembly used in brake systems is the tandem type in which, as shown in FIG. 1, there are provided two pistons, that is, a first piston 2 disposed in the rear part of a conventinal cylinder 1 of uniform diameter, in connection to the push rod and a second piston 5 disposed in the front part of the cylinder with an operating brake fluid chamber 3 and a return spring 4 being interposed between the pistons 2 and 5. The chamber 3 and a chamber in front of the piston 5 are provided with respective outlet ports 6 and 7, each of these chambers being in communication with brake fluid reservoirs.

In this type of master cylinder assembly, however, if one of the brake fluid conduits, hoses and other parts connecting the respective outlet ports 6, 7 and the front and rear wheel cylinders should be damaged or fail for some reason or other, the brake stroke is undesirably elongated. As a result braking performance is impaired, making the dual-system unable to perform a normal braking operation.

On the other hand, in a conventional, stepped type master cylinder assembly, such as shown in FIG. 2, a large-diameter piston 9 and a small-diameter piston 10, formed integral with one another, are positioned in the inside of a stepped cylinder 8, so that operating brake fluid feed and discharge from outlet ports 6, 7 are accomplished simultaneously, but there is inevitably created a certain delicate operational difference between the parts connected to the outlet ports 6, 7, such as brake fluid conduit or hose, or wheel cylinder, brake shoe clearance and the like for the front wheels and those for the rear wheels. There are also differences in the generation of vapor locks, in the arrangement of accumulators and other conditions, resulting in difference in hydraulic rigidity or brake fluid discharge, so that brake fluid pressures provided from the two outlet ports 6, 7 shown in FIG. 2 would differ undesirably from one another.

Figure 3:
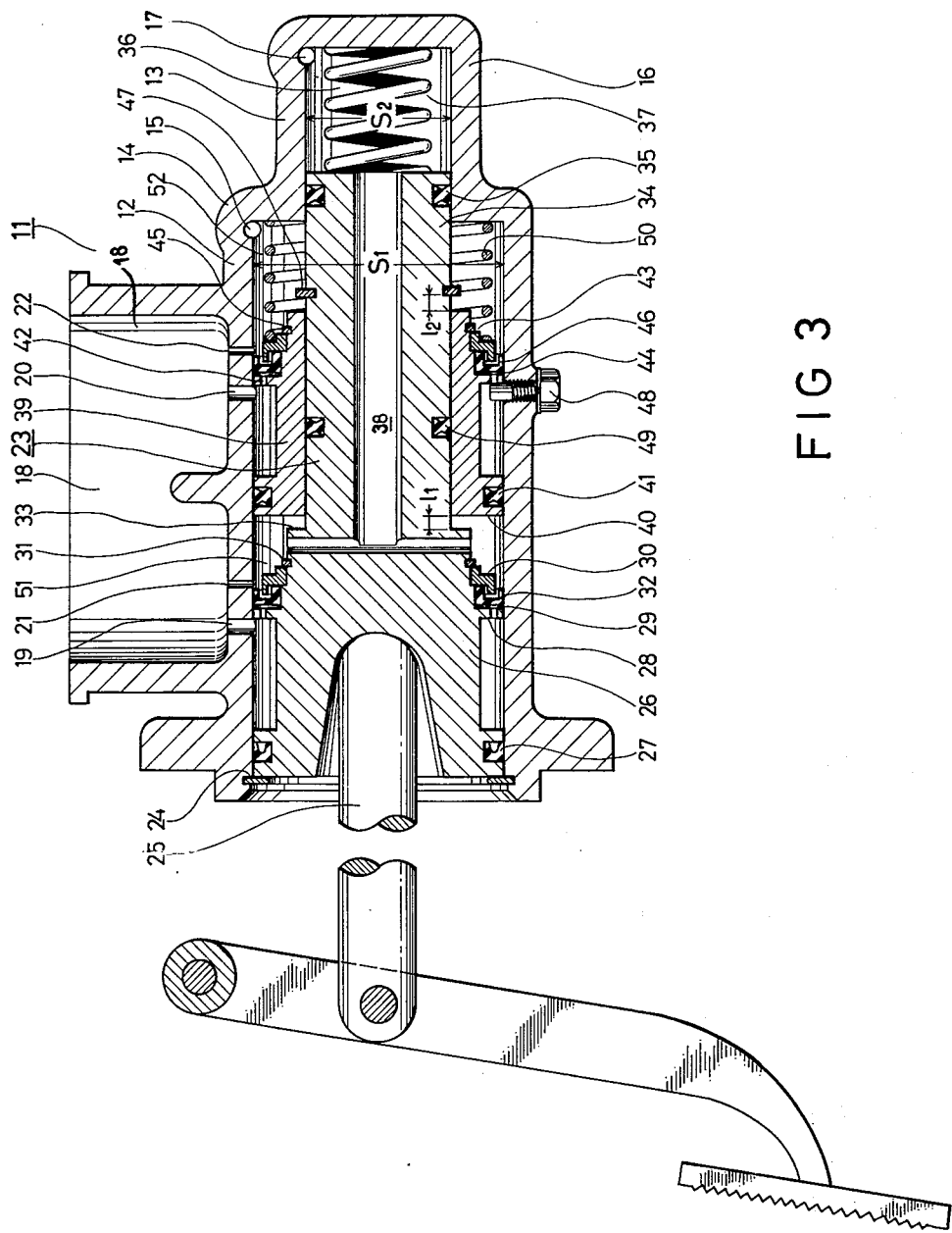
FIG. 3 is a diagrammatic, sectional view showing a first embodiment of a dual-system master cylinder assembly according to the present invention.

Referring first to FIG. 3, there is shown a dual-system, steped master cylinder assembly, generally designated by numeral 11, which includes a cylinder having a larger cylinder portion 12 with a diameter defining a sectional area $S_1$ formed in the rear part of the assembly and a small cylinder portion 13 with a diameter defining a sectional area $S_2$ formed in the front part of the assembly. A first outlet port 15 is provided adjacent to an upper inside part of a stepped portion 14 at the rear of the cylinder portion 12, while a second outlet port 17 is provided adjacent to an upper inside part of a head 16 of the small cylinder portion 13.

A pressurized brake fluid reservoir tank 18 is connected into the large cylinder portion 12 by way respectively of first and second supply ports 19 and 20 and compensating ports 21 and 22.

A piston body 23 is positioned in the cylinder 11, a stopper ring 24 being positioned at the rear end of the cylinder to prevent the piston body 23 from sliding out of the cylinder. The piston body 23 has a large-diameter portion 26 which is connected to a push rod 25 and which has a cup-like sealing ring rear end 27 and front end cuplike sealing ring 32 slidably contacted with the interior of the large cylinder portion 12, the front end sealing ring 32 being positioned between a spacer 29 and a retainer 30. A stopper ring 31 on the large-diameter portion 26 holds the retainer 30 in place. The spacer 29 is positioned adjacent an apertured flange 28 extending outwardly from the large-diameter portion 26. Extending forwardly from stepped portion 33 of the piston body 23 is a small-diameter piston 34 integral therewith and slidably fitted in the small-diameter cylinder portion 13, the small piston 34 being provided with a cup-like sealing ring 35 and a return spring 37, the spring 37 being disposed in a brake fluid pressure chamber 36 between the front end of the small piston 34 and the cylinder head 16. The piston body 23 is formed with a bore 38 therein extending between the front end of the small piston 34 and the stepped portion 33, thereby providing communication between the front operating brake fluid chamber 36 and a rear chamber 51.

A large piston 39 is provided externally of said small piston 34 and is slidably fitted in the large cylinder portion 12, the large piston 39 having formed near its rear end a double flange 40 defining a groove in which a cup-like sealing ring 41 is placed. Near its front end the large piston 34 is provided with an apertured flange 42, a retainer 43, a spacer 44 and a stopper ring 45, a cup-like sealing ring 46 being positioned between the spacer 44 and the retainer 43. The scope of movement of the large piston 39 relative to the large cylinder portion 12 and the piston body 23 is defined by a stopper ring 47 fixed in the piston body 23 for regulating advancement of the front end of the piston 39. A fixed, threaded stopper bolt 48 extends into the large cylinder portion for possible contact with the apertured flange 42 and the apertured flange 40 to limit axial movement of the large piston 39 with respect to the cylinder. The presence of the stepped portion 33 on the piston body 23 limits axial, backward movement of the piston 39 with respect to the piston body 23. In the non-operative condition shown in FIG. 3, clearances $2_2$ and $1_1$ of the large piston 39 relative to the stopper 47 and stepped portion 33, respectively, are set at suitable values which are determined according to hydraulic rigidity, brake fluid consumption and/or other factors of the brake fluid pressure distribution piping system (not shown) connected to the outlet ports 15 and 17.

A cup-like, sealing ring 49 is provided between the small piston 34 and large piston 39, a return spring 50 is provided for the large piston 39.

In operation of the just described arrangement, when the brake pedal is stepped in for effectuating the braking operation from the initial non-operative condition shown in the drawing, a pressing force regulated by the setting pedal ratio is given to the push rod 25 to let the piston body 23 advance, and when the sealing ring 32 passes the compensating port 21, pressure in the rear chamber 51 is boosted to urge the small piston 34 to advance against the resisting force of the return spring 37 to build up a brake fluid pressure in the front operating brake fluid chamber 36 through the bore 38. In the meantime, hydraulic reaction force in the chamber 36 is brought into the rear chamber 51 via the bore 38 allowing the large piston 39 to advance against the force of the return spring 50, and as the sealing ring 46 passes the compensating port 22, brake fluid pressure is now produced in the brake fluid operating chamber 52.

Thus, as both the operating brake fluid chambers 36 and 51 are placed in communication with one another through the bore 38 as a result of movement of the large piston 39, pressures in both operating chambers 36 and 51 are always maintained substantially equal to each other even if hydraulic rigidity and other piping conditions from the respective outlet ports 15 and 17 are somewhat different from each other, and also adjustment of pressure balance during this period can be well accomplished by slight movement of the large piston 39 relative to the small piston 34 between the stepped portion 33 and the stoper ring 47.

In case trouble occurs in one of the two systems during the braking operation and brake fluid pressure in, for example, the brake fluid pressure chamber 36 is reduced, the piston body 23 moves through only a slight stroke, for example the distance of $1_1$, before the stepped portion 33 directly pushes the large piston 39 thereby producing additional brake fluid pressure in chamber 52. In this case, if arrangement is made such that $S_1 = 2S_2$, then double as high brake fluid pressure is produced in the brake fluid pressure chamber 52 with same pressing force applied to the push rod 25, and such doubled brake fluid pressure is force out from the outlet port 15 to impart double as high braking force to the braking system on that part of the dual system not in trouble. Thus, even if one of the two braking systems should fail, substantially as effective braking performance as in normal braking operation is provided to the vehicle wheels as a whole.

On the other hand, if trouble develops in the brake fluid pressure chamber 52, for example the large piston 39 advance the distance of $1_2$ and the small piston 34 operates to produce the likewise multiplied output brake fluid pressure in the chamber 36. Thus, the stroke loss suffered in this operation is merely $1_1$ or $1_2$.

Thus, in case brake fluid discharge from the brake fluid pressure chamber 36 is high or hydraulic rigidity is low as in the event of trouble, the distance of advancement of the piston body 23 becomes greater than that of the large piston 39, so that the relation between these two pistons changes such that $1_1$ becomes smaller and $1_2$ becomes larger, while in case brake fluid discharge from the brake fluid pressure chamber 52 is high or hydraulic rigidity of brake fluid therefrom is low, the relation between the two pistons changes such that $1_1$ becomes greater and $1_2$ becomes smaller. In this way, balance of pressures in both brake fluid pressure chambers 36 and 52 is automatically maintained.

When foot pressure on the brake pedal is released upon completion of the braking operation, both the piston body 23 and the large piston 39 are reset to their initial positions by the action of the return springs 37 and 50, respectively.

Figure 4:
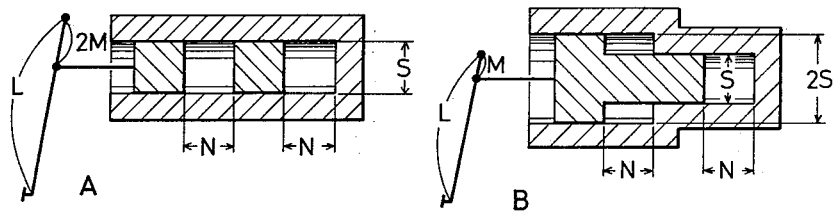
FIGS. 4A, 4B and 4C are simplified, respective schematic sketches of dual-system master cylinder assemblies of the types shown respectively in FIGS. 1–3.
Figure 4:
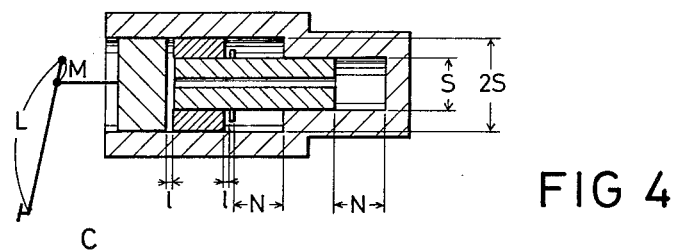

The graphs of FIGS. 5a to 5d show the data obtained from both theoretical and experimental considerations of pedal ratios, strokes, defined ranges and sectional areas in the conventional devices shown in FIGS. 1 and 2 and those in the above-described embodiment of the present invention illustrated in FIG. 3 with the factors being schematized diagrammatically in FIGS. 4A and 4B for conventional devices and in FIG. 4C for the present invention. The relation between stepping force F and brake fluid pressure P is as represented in FIG. 5a when both systems operate normally. It will be noted that such relation according to the present invention is better than that in the conventional B type. The same relation in the event of failure of one of the systems is represented in FIG. 5b, indicating the present invention is superior to the conventional A type in this case.

The relation between stepping force F and braking force C is as shown in FIG. 5c, that is, in the case of normal operation, the relation is represented by straight line $C_1$ in all types. It will be also noted from the foregoing explanation that the same braking force is provided, as represented by straight line $C_1$, even in the event of failure of one of the systems in the present invention and in the conventional B type alone. In the case of conventional type A, the braking force is lowered as depicted by line $C_2$ with the same stepping force applied.

FIG. 5d shows the relation between stepping force F and stroke S in the event of failure of one of the brake systems. It is noted that a sizable stroke loss is caused in the conventional A type, but in the device of the present invention, only a very small stroke loss equivalent to $1_1$ or $1_2$ is caused, and it therefore suffers no large or detrimental stroke loss of one full system as caused in the conventional A type.

Referring now to FIG. 6, there is shown a second embodiment of a dual system master cylinder assembly according to the present invention. A stepped cylinder 53 comprising a central large cylinder portion 54 with a diameter defining a sectional area $S_1$, a front small cylinder 55 with a diameter defining a sectional area $S_2$, and a rear small cylinder portion 56 with a diameter defining a sectional area $S_3$ ($S_3 < S_1$). A first outlet port 58 is provided adjacent to an upper inside part of a front stepped portion 57 and a second outlet port 60 is provided adjacent to an upper inside part of a head 59 of the small cylinder portion 55.

A first pressurized brake fluid reservoir tank 61 connected into the large cylinder portion 54 by way of a supply port 62 and a compensating port 63, while a second reservoir tank 64 is provided in the front small cylinder portion 53, the tank 64 having a supply port 65 and a compensating port 66.

A piston body 67 is inserted into the stepped cylinder 53. Formed at the rear end of the piston body 67 is a small piston 68 fitted in the rear small cylinder portion 56, with a rear cup-like sealing ring 69 being sealedly interposed therebetween. Formed at the front of the rear small piston 68 is an intermediate piston 71 inserted in the front small cylinder portion 55 with a stop flange 70 in contact with a rear step of the cylinder 53. A cup-like sealing ring 72 is formed toward the front end of the intermediate piston 71 in contact with the interior of said small cylinder portion 55.

Structurally, the small cylinder portion 55 is joined to the large cylinder portion 54 at their respective outer flanges 73, 74 by means of bolts 75 and nuts 76 and sealed by a sealing member 77. A small-diameter piston portion 79 is fitted in a small cylinder portion 78, and a cup-like sealing ring 83 is slidably contacted with the inside of the small cylinder portion 55 with the media of an apertured flange 80, a retainer 81 and a stopper ring 82. Also, a return spring 85 is disposed in a front brake fluid chamber 84 between the retainer 81 and the head 59 of the small cylinder portion 55. The piston body 67 has a bore 86 extending from the end of said small piston 79 to the flange 70.

A large piston 87 is provided externally of the piston body 67 and slidably fitted in the large cylinder portion 54. It has formed in its rear flange 88 which defines a groove, a cup-like sealing ring 89 and towards its front end another cup-like sealing ring 93 through the media of an apertured flange 90, a retainer 91 and a stopper ring 92. The extent of movement of the large piston 87 relative to the large cylinder portion 54 and the piston body 67 is defined by a stopper ring 94 embedded in the piston body 67 for regulating advancement of the front end of the large piston 87 and a stopper bolt 95 provided in the large cylinder portion 54 for stopping the apertured flange 90 and also by the presence of the stop flange 70. In the non-operative conditions shown in FIG. 6, the clearances $l_1$ and $l_2$ of the large piston 87 relative to the stopper ring 94 and apertured flange 80 are set at suitable values which are determined according to hydraulic rigidity, brake fluid consumption and other factors of the hydraulic piping (not shown) connected to the outlet ports 58 and 60.

As shown in FIG. 6, as air vent 96 is formed in the rear part of a large cylinder chamber 97, a return spring 98 being interposed between the stepped portion 57 and the retainer 91 at the front of the large cylinder chamber 97, a push rod 99 connects the piston 68 to a brake pedal bar.

In operation of the dual-system master cylinder assembly of FIG. 6, when the brake pedal is depressed under the non-operative condition shown in the drawing, a pressing force regulated by the set pedal ratio is given to the push rod 99 to effect advance of the piston body 67, and as the sealing ring 83 passes over the compensating port 66, pressure in the brake fluid pressure chamber 84 is boosted against the force of the return spring 85, leading a hydraulic reaction force into the rear chamber 97 of the large cylinder portion through the bore 86 to let the large piston 87 move forward against the force of the return spring 98 to develop brake fluid pressure in a brake fluid operating chamber 100 after passage of the sealing ring 93 over the compensating port 63.

As the brake fluid pressure chambers 84 and 97 are in communication with one another through the bore 86 in the back and forth movable large piston 87, as mentioned above, pressures in both the chambers 84 and 97 are maintained substantially equal to each other even if hydraulic rigidity and consumption of brake fluid from the respective outlet ports 58 and 60 somewhat differ. Adjustment of pressure balance during this period can be well accomplished by slight movement of the large piston 87 relative to the piston body 67 between the stop flange 70 and the stopper ring 94.

Thus, in case brake fluid discharge from the brake fluid pressure chamber 84 is high or hydraulic rigidity of brake fluid from this chamber is low, the piston body 67 advances more than the large piston 87 so that the relation between these two pistons is such that $l_1$ becomes smaller and $l_2$ becomes greater, while when brake fluid discharge or hydraulic rigidity of brake fluid from the brake fluid pressure chamber 100 is low, the large piston 87 advances more than the piston body 67 so that the relation between them is such that $l_2$ becomes smaller and $l_1$ becomes larger. Thus, pressures in both brake fluid pressure chambers 84 and 100 are automatically balanced.

As for the relation between axial force of the push rod 99 and brake fluid pressure produced, it is to be noted that the reaction force required for the push rod 99 can be well accommodated by the amount of reaction force given to the sectional area $S_3$ of the small piston 68 at the rear part of the piston body 67 because the sectional area $S_3$ has the relation of $S_3 < S_1$ ($S_1$ being the sectional area of the large piston 87), so that axial force of the push rod 99, and hence pedal stepping force required for the braking opera-is greatly lessened as compared with the case where said sectional area $S_3$ is equal to the section $S_1$ of the large piston 87. If spring force, frictional force and other minor matters are ignored, the following relation exists at this time between push rod input $F_O$ and brake fluid pressure P: $F_0 = PS_3$.

As regards the brake fluid pressure produced in the event of failure of one of the systems, if pressure in the brake fluid pressure chamber 100 is lost, the large piston 87 is pushed forwardly to hit the stopper 94 by the pressure built up in the brake fluid pressure chamber 84. The relation between axial force $F_1$ of the push rod 99 and brake fluid pressure P produced is given by the following equation:

$$F_1 = S_3P - (S_1 - S_2)P$$

Apparently, $F_O > F_1$ for the same P. Conversely speaking, a higher brake fluid pressure can be produced at the time of loss of hydraulic pressure in the chamber 100 for the same axial force of the push rod 99.

In case the brake fluid pressure chamber 84 fails, the large-diameter piston 87 hits against the stop flange 70 of the small-diameter piston 68, the thereafter the relation between axial force $F_3$ of push rod and brake fluid pressure P become as follows:

$$F_3 = (S_1 - S_2)P$$

Therefore, if setting is made such that $S_3 > S_1 - S_2$, $F_0$ becomes smaller than $F_3$ ($F_3 > F_O$) in this case, too, allowing generation of high brake fluid pressure for the same axial force of push rod 99. In either case, impairment of braking efficiency or drop of braking performance to the vehicle wheels in the event of failure of one system can be well compensated by the elevated brake fluid pressure in the other system.

If the foot pressure on the pedal is released upon completion of the braking operation, both the piston body 67 and large piston 87 are forced back to their initial positions by the action of the return springs 85 and 98, respectively.

As described above, according to the stepped master cylinder assembly of the present invention, as a large pistion is slidably mounted around the piston body fitted in the small cylinder portion and the front end of the piston body is communicated with the rear chamber of the large piston by the bore in the piston body, output brake fluid pressures of the two brake systems can be always balanced at a same level in spite of difference in brake fluid discharge or hydraulic rigidity in the two systems. It is also possible to make setting such that in the event of failure of one system, multiplied braking force will be developed with the same pedal stepping force as in normal operation.

Further, in the braking operation in the event of system failure, the stroke loss suffered in such operation can be minimized as required output of brake fluid pressure can be obtained immediately with a small-distance movement of the large cylinder portion relative to the piston body.

Moreover, since the large piston is loosely mounted around the piston body fitted in the small cylinder portion, with the front end of said piston body being communicated with the rear part of the large piston by the hollow in said piston body, output brake fluid pressures in the two brake systems can always be balanced at a same pressure regardless of difference in brake fluid discharge or hydraulic rigidity of the two systems, and further, since the rear part of the piston body is formed smaller diametrically than the large piston, high braking performance can be secured with a low pedal stepping effort. Still further, in the event of failure of one system, multiplied brake fluid pressure can be developed with the same stepping force as in normal operation to well compensate for reduction of braking force caused by such failure. Furthermore, in the braking operation in the event of failure of one of the systems, the stroke loss suffered in such operation can be minimized as required brake fluid pressure output can be provided immediately with merely a small-distance movement of the large cylinder portion relative to the piston body.

What is claimed is:

1. A dual-system master cylinder assembly comprising, in combination:
    a cylinder having a large-diameter cylinder portion and a small-diameter cylinder portion, said small-diameter cylinder portion having a head and said small-diameter cylinder portion being disposed in front of said large-diameter cylinder portion;
    a piston body having a front face and being positioned within said cylinder, said piston body having a diameter corresponding to that of said small-diameter cylinder portion and being slidably arranged for actuating pressure therein;
    a front pressure chamber defined between said head and said front face of said piston body;
    a rear pressure chamber;
    said piston body having means thereon for cooperating with a first compensation port to control communication between a fluid reservoir and one of said front and rear pressure chambers;
    a large piston slidably mounted around said piston body so as to be relatively movable thereon, said large piston having a front surface and a rear surface and means on said large piston adjacent said front surface for cooperating with a second compensation port to control communication between said fluid reservoir and a brake fluid operating chamber defined between said large-diameter cylinder portion, piston body, large piston front surface and a land between said large-diameter cylinder portion and small-diameter cylinder portion, said piston body including a bore extending axially therethrough providing continuous fluid communication from said front pressure chamber, defined between said head and said front face of said piston body, to said rear pressure chamber, said rear pressure chamber being defined by the wall of said large-diameter cylinder portion, surface of said piston body and said rear surface of said large piston.

2. A dual system master cylinder assembly as set forth in claim 1, wherein a rear part of said piston body is formed into a small piston portion smaller in diameter than said large-diameter piston and including a push rod coupled therewith and fitted in a corresponding small cylinder portion of said cylinder.

3. A dual-system master cylinder assembly as set forth in claim 2, including means for limiting range of movement of said large piston relative to the piston body.

4. A dual-system master cylinder assembly as set forth in claim 1, including means for limiting range of movement of said large piston relative to said piston body.

5. A dual-system master cylinder assembly as set forth in claim 1, including a first spring positioned between said head and said piston body, and a second spring positioned between said front surface of said large piston and said land between said large-diameter cylinder portion and said small-diameter portion of said cylinder.

6. A dual-system master cylinder assembly as set forth in claim 5, including means for limiting relative axial movement between said piston body and said large piston.

7. A dual-system master cylinder assembly as set forth in claim 5, wherein said first spring and said second spring are different in strength so as to control difference of fluid pressure between said front pressure chamber and said rear pressure chamber.

* * * * *